(12) United States Patent
Jackson

(10) Patent No.: US 8,048,830 B1
(45) Date of Patent: Nov. 1, 2011

(54) METHOD OF FORMING AND USING CARBONATED MACHINING FLUID

(75) Inventor: David P. Jackson, Saugus, CA (US)

(73) Assignee: Cool Clean Technologies, Inc., Eagan, MN (US)

( * ) Notice: Subject to any disclaimer, the term of this patent is extended or adjusted under 35 U.S.C. 154(b) by 252 days.

(21) Appl. No.: 12/488,457

(22) Filed: Jun. 19, 2009

Related U.S. Application Data

(60) Provisional application No. 61/074,007, filed on Jun. 19, 2008.

(51) Int. Cl.
C10M 169/04 (2006.01)
(52) U.S. Cl. .................................... 508/154
(58) Field of Classification Search ............. 508/154
See application file for complete search history.

(56) References Cited

U.S. PATENT DOCUMENTS

| | | | |
|---|---|---|---|
| 3,672,181 A | 6/1972 | Tyree, Jr. | |
| 4,022,119 A | 5/1977 | Karr | |
| 4,100,085 A | 7/1978 | Peditto et al. | |
| 4,973,411 A | 11/1990 | Jao et al. | |
| 5,041,231 A * | 8/1991 | Damin et al. | 508/397 |
| 5,140,822 A | 8/1992 | Gupta | |
| 5,226,506 A | 7/1993 | Link | |
| 5,231,851 A | 8/1993 | Adolfsson | |
| 5,326,486 A | 7/1994 | Mizui et al. | |
| 5,409,418 A | 4/1995 | Krone-Schmidt et al. | |
| 5,549,177 A | 8/1996 | Hosokawa et al. | |
| 5,580,845 A | 12/1996 | Ruane | |
| 5,820,705 A | 10/1998 | Yu et al. | |
| 6,015,778 A * | 1/2000 | Rolfes et al. | 508/394 |
| 6,050,756 A | 4/2000 | Buchholz et al. | |
| 6,436,021 B2 | 8/2002 | Nukui | |
| 6,448,207 B1 | 9/2002 | Fukutani et al. | |
| 6,786,977 B2 | 9/2004 | Spuller et al. | |
| 6,858,869 B2 | 2/2005 | Fujiwara | |
| 7,018,959 B2 | 3/2006 | McCullough et al. | |
| 7,337,879 B2 | 3/2008 | Jager et al. | |
| 7,414,015 B2 | 8/2008 | Skerlos et al. | |
| 2002/0035043 A1 | 3/2002 | Yokota et al. | |
| 2005/0059559 A1 | 3/2005 | Nettleship et al. | |
| 2007/0199359 A1 | 8/2007 | Rajagopalan | |
| 2007/0259766 A1 | 11/2007 | Jackson | |
| 2008/0026967 A1 | 1/2008 | Suda et al. | |

OTHER PUBLICATIONS

Kiger, Ken & Kim, Jungho; Effects of Dissolved Gas, Surface Enhancement, and Fluid Enhancement on Spray Cooling Heat Transfer, VITA CoolCon, May 2004.

(Continued)

Primary Examiner — John R Hardee
(74) Attorney, Agent, or Firm — DuFault Law Firm, P.C.; Dustin R. DuFault

(57) ABSTRACT

A method of forming and delivering a carbonated machining fluid to be used in a machining process, the machining process including a tool contacting a substrate, comprises supplying a pressure vessel with a non-carbonated machining fluid and non-supercritical carbon dioxide. The machining fluid and carbon dioxide are allowed to admix such that at least a portion of the carbon dioxide dissolves into the machining fluid to form the carbonated machining fluid. The carbonated machining fluid is then delivered under pressure from the vessel to an applicator and applied to the tool or the substrate to impart cooling and lubricating effects.

16 Claims, 6 Drawing Sheets

OTHER PUBLICATIONS

Fluid Application—MQL (Minimum Quantity Lubrication), Trim Technical Bulletin, 2006, Master Chemical Corporation.

Kho, Conrad & Knutson, Phase Equilibria and Thermophysical Properties of Carbon Dioxide-Expanded Fluorinated Solvents, Fluid Phase Equilibria, pp. 179-193, vol. 206, N 1-2, Apr. 30, 2003.

Kubie, Lawrence S., The Solubility of O2, CO2, and N2 in Mineral Oil and the Transfer of Carbon Dioxide From Oil to Air, The Journal of Biological Chemistry, pp. 545-548, Johns Hopkins Medical School, 1927.

Salmon, Stuart C., Dr., Manufacturing Engineering: Using High Pressure Fluids, Society of Manufacturing Engineers, Jun. 2004.

* cited by examiner

METHOD OF FORMING AND USING CARBONATED MACHINING FLUID

CROSS-REFERENCE TO RELATED APPLICATION(S)

This application claims the benefit of U.S. Provisional Patent Application No. 61/074,007 filed on 19 Jun. 2008, which is hereby incorporated herein by reference.

BACKGROUND OF INVENTION

The present invention generally relates to machining fluids for cooling and lubricating in hard turning machining applications. More specifically, the present invention relates to carbonated machining fluids which exhibit enhanced physicochemical properties to improve several aspects of the machining operation.

Large volumes of metalworking fluids are used in manufacturing industries each year for cooling and lubricating substrate work pieces and tools during machining operations. Cooling of either a tool or a workpiece at their interface involves both macroscopic and microscopic mechanisms. Macroscopically, heat elimination is a concern and typically involves directing a machining fluid onto the tool or work piece to remove heat in the form of thermal energy caused by friction between the tool and the workpiece. Microscopically, heat management involves reactive fluid constituents entering and reacting with tool/workpiece interface to reduce friction.

Increasing either the volumetric flow rate or the impingement pressure of a metalworking fluid at the tool/substrate interface is a conventional means for improving heat removal. Increasing the volumetric flow rate of the fluid near the boundary layer beneficially increases turbulence and heat removal in this region. This is achieved through exerting higher spray pressures of the coolant within the cutting zone, typically greater than 7 MPa (1000 psi). A variety of methods are suggested in the prior art for forming and delivering high pressure and high velocity metalworking fluids including, for example, the use of supercritical fluids. However, a number of challenges are associated with using such fluids that require relatively high pressures for proper delivery into the cutting zone. These include a need for expensive high pressure pumps and machining tool seal modifications to handle the increased pressures.

In addition to fluid pressure, a number of other factors can be considered to affect boundary layer fluid velocity. Metalworking fluid properties such as viscosity, surface tension, molecular size, and reactivity predominate at the cutting surface and within capillary interfaces. These physicochemical properties can be optimized to allow the metalworking fluid to penetrate the cutting zone more efficiently and to flow along surfaces at much higher velocities. For example, lowering viscosity and surface tension of the metalworking fluid is a way of improving boundary layer velocity to enhance heat extraction.

Conventional methods for lowering viscosity and surface tension include the use of base stock fluids having low viscosities and surface tension. For example, dense fluids such as high pressure liquids or supercritical carbon dioxide can be used as bulk metalworking fluids as a solvent, into which solute lubricant additives are added to provide the necessary reactive boundary layer constituents. However, like the high pressure metalworking fluid discussed above, these approaches are particularly expensive and complicated requiring specially designed high pressure plumbing in the machining tools. For example, the fluid seals of most machining tools cannot tolerate pressures greater than about 7 MPa (1000 psi).

Another technique includes the use of high velocity solid phase carbon dioxide composite coolant-lubricant sprays. Such composite carbon dioxide sprays resolve the high pressure limitations of dense fluids by delivering the beneficial chemistry of a dense fluid within a solid phase packet which is delivered in relatively low-pressure compressed air. Examples of these can be found in commonly owned U.S. Pat. No. 7,293,570 and U.S. application Ser. No. 11/301,466. However, in such composite sprays it can be difficult to maintain an appropriate solid-gas-liquid mixture through long distances through tortuous plumbing schemes found in many existing machining tools.

Finally, metalworking fluids of the prior art eventually accumulate microbial growth during use. Even new metalworking fluids, once dumped into a machining fluids sump, rapidly begin to degrade due to the microbial growth therein. Conventional methods involving metalworking fluid curb microbial growth by using, for example, biocides which have generally been found to be ineffective. New techniques are needed to control microbial growth.

The present predominant mode of cooling and lubricating during machining involves flooded applications of metalworking fluids. There therefore exists a need to improve the performance of these fluids. As such the present invention provides a means for boosting cooling and lubrication performance of conventional metalworking fluids and delivery systems, as well as providing a means for improving coolant longevity and quality.

SUMMARY OF INVENTION

The present invention utilizes a novel approach for optimizing physicochemical properties of machining fluids (as a solvent) utilizing carbon dioxide as a reactive cooling and lubricating additive (as a solute). In a first aspect of the present invention, and in contrast to the prior art using carbon dioxide, conventional machining fluids, such as oil-water emulsion coolants or oil lubricants, are employed as bulk solvents into which carbon dioxide solid-gas or gas is added as a solute to form a cooled carbonated machining fluid saturated with carbon dioxide gas. Under near-saturated or saturated conditions, absorbed carbon dioxide imparts beneficial changes in flow, penetration and heat transfer qualities to the machining fluid. Carbonated machining fluids flow at higher velocities due to less internal friction through machine plumbing and most importantly through tool fixtures such as spray-through-tool cutting tools. Of particular importance, carbonated machining fluids pressurized through a cutting tool-workpiece interface exhibit lower viscosity and surface tension. This enhances wettability of and penetration of the metalworking fluid constituents into the cutting interfaces.

In another aspect of the present invention, solid-gas carbon dioxide is injected into a machining fluid to form a cooled and carbonated machining fluid. A liquid phase is condensed to a fine solid-gas mixture phase which may be injected into a feed line just ahead of a conventional liquid pump or may be used to cool and carbonate a bulk tank containing a machining fluid. As such, this aspect of the present embodiment provides a more efficient means for injecting relatively low pressure carbon dioxide into a machining fluid, requiring no auxiliary and expensive liquid carbon dioxide pressure and valve regulation. Another advantage of injecting a solid phase coolant into a metalworking fluid is improved heat and mass transfer. A sublimating solid-gas-liquid interface exhibits greater heat transfer due to a much larger ΔT as compared to conventional carbonation methods employing gas-only injection. Solid phase carbon dioxide particles sublimate and subcool the surrounding liquid fluid particles, forming microscopic carbon dioxide hydrates or clathrates, and forming oil-carbon dioxide, water-carbon dioxide, water-oil-carbon dioxide microemulsions depending upon the machining fluid employed.

In another aspect of the present invention, carbonated machining fluids may be compressed using a high pressure pump to change the saturated gas phase to form a dispersed liquid fluid phase within a carbonated machining fluid. Preferably, this occurs within the tool body or cut zone. Dense phase carbon dioxide solute provides enhanced lubrication and cooling during chemical plasticization and complexation, enhanced lubricity and Joule-Thompson expansion as the machining fluid exits the cut zone. Using this technique, the viscosity and surface tension enter the cut zone at a much lower value as compared to those same metrics as the fluid leaves the cut. An initial lower viscosity and surface tension allows the carbonated machining fluid to enter the cut more efficiently, upon which the normal viscosity and surface tension of the non-carbonated machining fluid return as the carbon dioxide is evacuated therefrom under the heat and pressure conditions within the cut zone.

Thus the present invention uniquely provides a method for enhancing nucleate boiling within the cut zone which increases the maximum amount of machining heat that can be dissipated, plasticizes the metalworking fluid to lower surface tension and viscosity, provides additional lubrication benefits due to carbon dioxide fluid co-present in the cutting zone with the machining fluid and provides an in-situ means for destroying entrained microbial matter in the metalworking fluid.

BRIEF DESCRIPTIONS OF DRAWINGS

DETAILED DESCRIPTION

Figure 1:
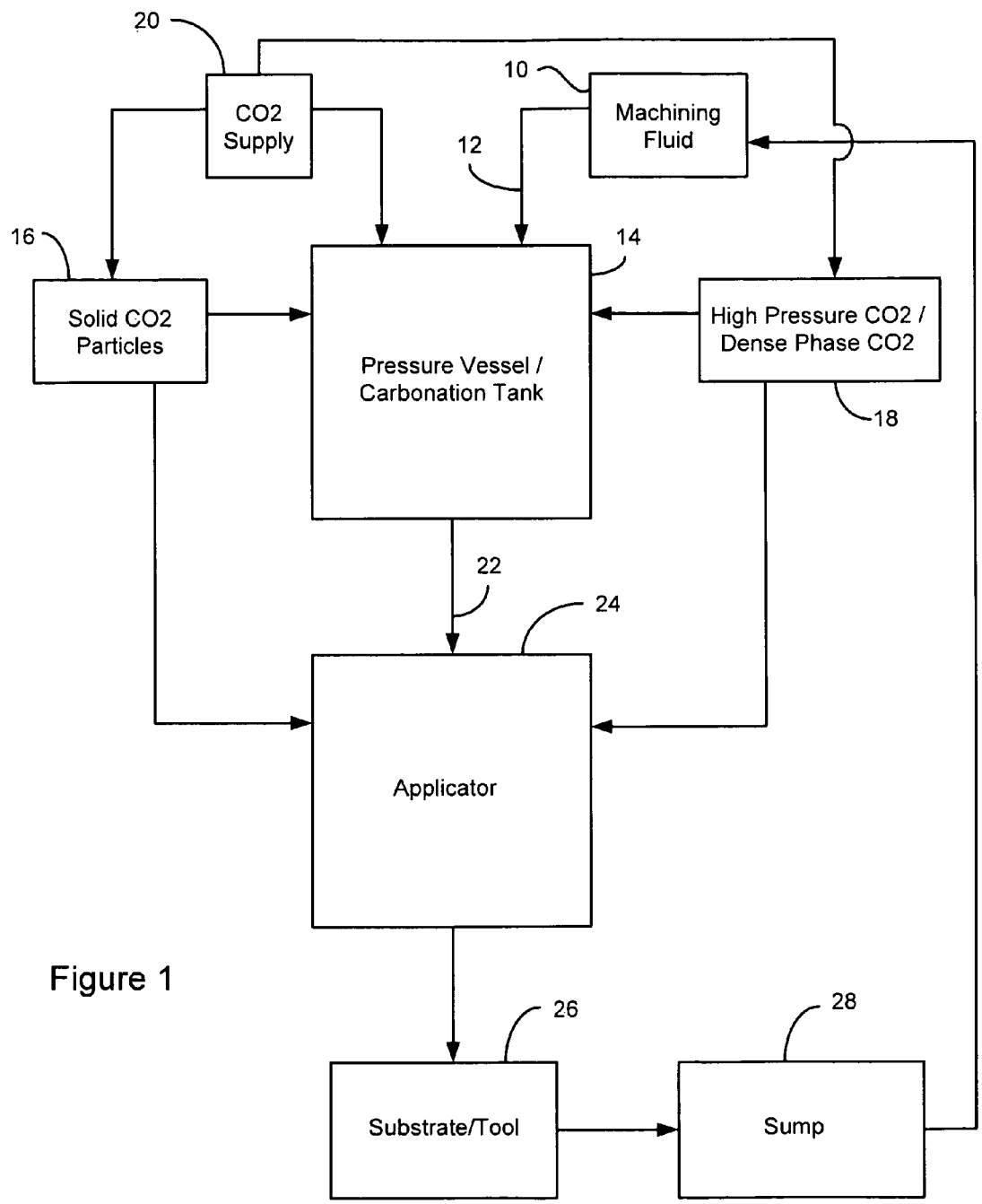
FIG. 1 is flow chart depicting the method of forming and employing a carbonated machining fluid of the present invention.

The carbonated machining fluid of the present invention includes a machining fluid acting as a solvent, with the carbon dioxide dissolving therein as a solute. It has been discovered that by employing the lubricant as the solvent and the carbon dioxide gas as the solute, and especially when the resulting carbonated fluid is used with minimum quantity lubrication, the lubricity and wettability of the carbonated machining fluid is greatly enhanced. Using the technique of the present invention, the viscosity and surface tension values of the carbonated machining fluid entering the cutting zone are between 10-70% lower as compared to the same properties of the initial non-carbonated machining fluid. For purposes of this description, machining operations or machining processes refer to any process whereby a tool contacts a substrate and frictional heat is produced at the interface between the tool and the substrate, or cutting zone. Non-exhaustive examples of machining processes include, but are not limited to, hard turning processes including lathe processes, drilling processes, milling processes and other metalworking processes. While the aforementioned processes are typically used in regards to the machining of metal substrates, it should be noted that the present invention may also be used on substrates of various substance and construction including, but not limited to, plastics, ceramics, wood and composites.

In contrast to existing methods using carbon dioxide, a general aspect of the present invention includes the use of a machining fluid employed as a bulk solvent into which carbon dioxide is dissolved as a solute to form the carbonated machining fluid. Such machining fluid preferably has an initial static viscosity of at least 2.0 centipoise. While it is preferable that the machining fluid comprise a non-aqueous oil lubricant, it is well within the scope of the present invention to provide conventional oil-water emulsion coolants as the initial machining fluid. Non-exhaustive examples of non-aqueous machining fluids include, but are not limited to, bio-based oils, synthetic oils, semi-synthetic oils, petroleum-based oils including mineral oil, alcohol esters including soy methyl esters, tetrahydrofufuryl alcohol and ethyl lactate, alcohols including ethanol, ketones including acetone, polyglycols, phosphate esters, hydrocarbons and silicones. An exemplary non-aqueous lubricant includes those as sold under the BOELUBE® line of products as made commercially available through The Oreolube Corporation of Bellport, N.Y. More particularly, non-exhaustive examples of bio-based oils include, but are not limited to, vegetable oils including corn oil, soybean oil, sunflower oil, peanut oil, safflower oil, flaxseed oil and canola oil. Exemplary bio-based oils include those as sold under the COOLWAY™, NUTCUT™ and SOYEASY™ line of products as made commercially available through Environmental Lubricants Manufacturing, Inc. of Cedar Falls, Iowa. Optionally, both solid and liquid additives may be added to any of the aforementioned machining fluids including, but not limited to, oxidation inhibitors, corrosion inhibitors, rust inhibitors, extreme pressure agents including chlorinated paraffinic oils, boron nitride, molybdenum disulfide, polytetrafluoroethylene, pour point additives, detergents, dispersants, foam inhibitors, trace amounts of water, and any combinations thereof.

It has been surprisingly discovered by the present inventor that the dissolved carbon dioxide gas in the aforementioned machining fluids, when under near-saturated, saturated or super-saturated conditions, effects beneficial changes in flow, penetration and heat transfer qualities to the selected machining fluid. The machining fluid is preferably carbonated to saturated or near-saturated levels, but it should be understood that carbonation below saturation effects beneficial changes in the machining fluid, and thus be well within the scope of the present invention. Further, while super-saturated carbonated machining fluids can be employed with the present invention, such super-saturation preferably occurs within the body of the applicator itself, just prior to the carbonated machining fluid being applied to the tool/substrate. For purposes of this description, a non-carbonated machining fluid will be considered as having a carbon dioxide vapor pressure less than 500 kPa (70 psi), while a carbonated machining fluid will be considered as having a carbon dioxide vapor pressure of at least about 500 kPa (70 psi), while a near-saturated carbonated machining fluid will have a carbon dioxide vapor pressure between about 2.5 to about 3.5 MPa (400 to 500 psi) and a saturated carbonated machining fluid will be any lubricant having a carbon dioxide vapor pressure between about 3.5 to about 5.5 MPa (500 to 800 psi). Lubricants or machining fluids having a carbon dioxide vapor pressure greater than about 5.5 MPa (800 psi) result in the formation of liquid carbon dioxide within the lubricant, which tends to freeze transport lines and oils gel upon the immediate introduction of the carbonated fluid into ambient pressures. As such, most preferable carbonated machining fluids generally include those having vapor pressure ranges between about 5 kPa to about 5.5 MPa (50 to 800 psi), which exhibit higher velocities through machine plumbing and, most importantly, through tool fixtures due to less internal friction. Generally speaking, the higher the saturation of the machining fluid with carbon dioxide, the more preferable the carbonated machining fluid becomes. Of particular importance, carbonated machining fluids introduced at the interface between the cutting tool and workpiece exhibit lower viscosity and surface tension. This enhances wettability of and penetration of the machining fluid constituents into the cutting interfaces.

In another aspect of the present invention, upon forming and delivering the carbonated machining fluid to the applicator, the carbonated machining fluid may be further compressed using a high pressure pump to at least partially change the saturated gas phase into a dispersed liquid fluid phase within the carbonated machining fluid itself, which is briefly maintained within the tool body of the applicator until delivered into the cutting zone. This results in the super-saturation of the carbonated machining fluid. Dense phase carbon dioxide solute provides enhanced lubrication and cooling during chemical interactions such as chemical plasticization and complexation, enhanced lubricity and Joule-Thompson expansion as the carbonated machining fluid exits the tool and enters into the cutting zone.

Further, and in instances where oil-water emulsion coolants are selected as the initial machining fluid, at elevated vapor pressures of carbon dioxide gas (>44 atm) and during Joule-Thompson expansion cooling (<20 C), stable gas hydrates (clathrates) may be formed which are stable ice-like structures of water containing significant volumes of near-liquid density carbon dioxide gas. The volume of carbon dioxide stored in these stable carbon dioxide hydrates is greater than what can be achieved with conventional aerosols using compressed air and, when heated in the cut zone, produce very high local pressures and streaming velocities at cutting surfaces as the carbon dioxide is released.

There are several means by which carbonation of the machining fluid can be accomplished in accordance with the present invention. A general method of forming and applying the carbonated machining fluid in accordance with the present invention is illustrated in FIG. 1. A suitable machining fluid, such as one or combination of the ones previously described, is transferred from a storage tank 10 by means of a conduit 12 into a pressure vessel 14. The pressure vessel 14 may be constructed from any suitable material and should safely handle pressures of up to 6.0 MPa (800 psi). To the pressure vessel is added non-supercritical carbon dioxide in any combination of solid phase 16, near-liquid dense phase 18 or gas phases 20. Upon intimate contact and increased pressures, the machining fluid absorbs the carbon dioxide to form the carbonated machining fluid. With the increased vapor pressure from the carbon dioxide, from either additional gas pumped into the pressure vessel or from sublimating solid carbon dioxide particles, the carbonation of the machining fluid increases and eventually approaches saturation. The near-saturated or saturated carbonated machining fluid is then transported via a pump through a high pressure pumping fluid conduit 22 to an applicator 24, such as a ported drill bit, or spray applicator. The carbonated machining fluid exits the applicator and upon so doing is injected into the cutting zone where the tool interfaces with the substrate work piece 26. Upon so doing, and going from a relatively high pressure to ambient conditions, the carbonated lubricant essentially boils and the carbon dioxide phase sublimates under the heat and pressure conditions to produce a foaming carbon dioxide gas-containing machining fluid which liberates machining heat, removes chips and provides lubrication. Following application of the carbonated machining fluid onto the tool, work piece, or both, the processed metalworking fluid containing residual carbon dioxide gas, chips and heat is collected in a sump 28 and returned to the storage tank 10 (after filtration).

Figure 2:
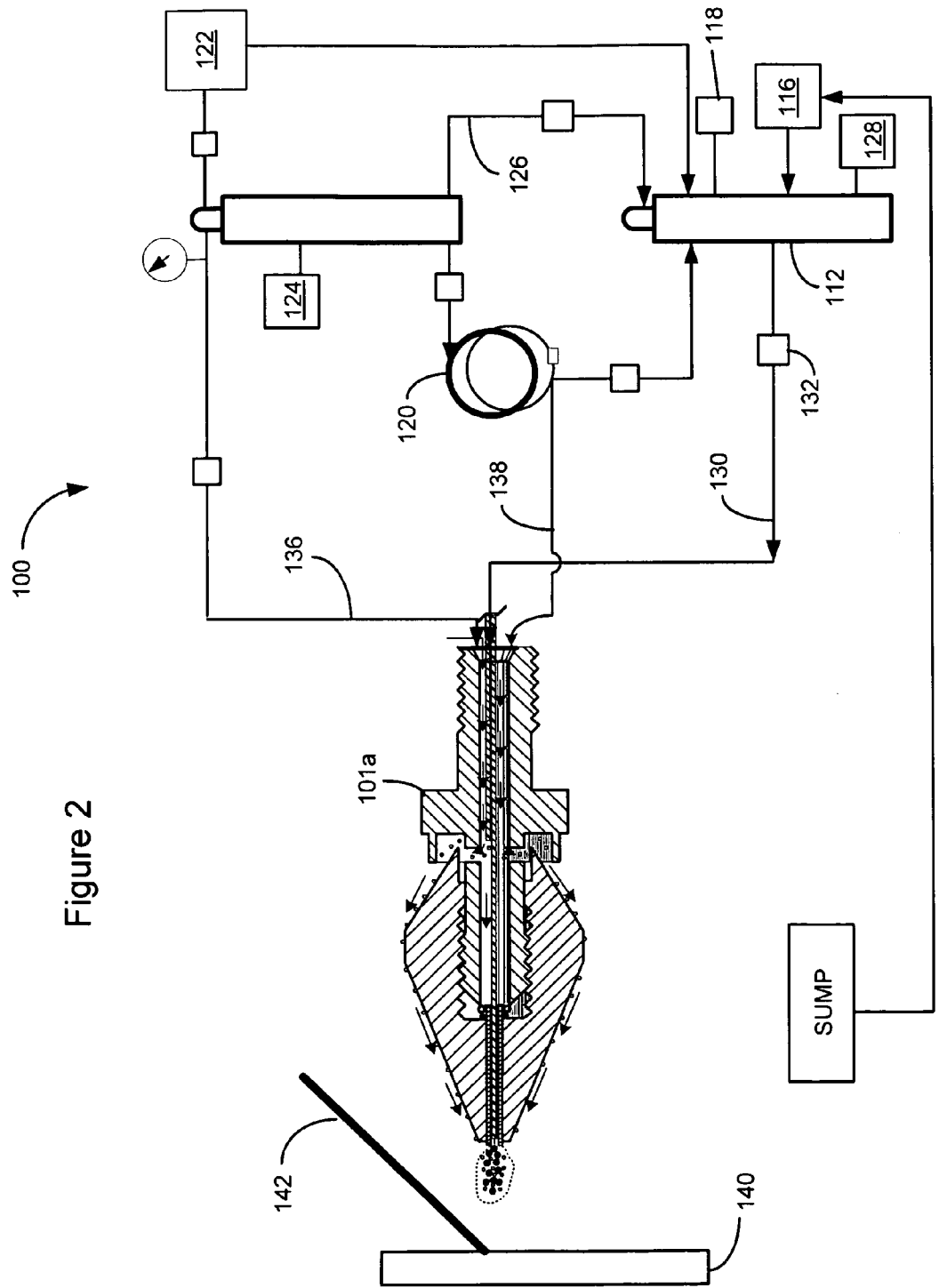
FIG. 2 is a diagram illustrating an embodiment of the present invention employing a spray-type applicator.
Figure 3:
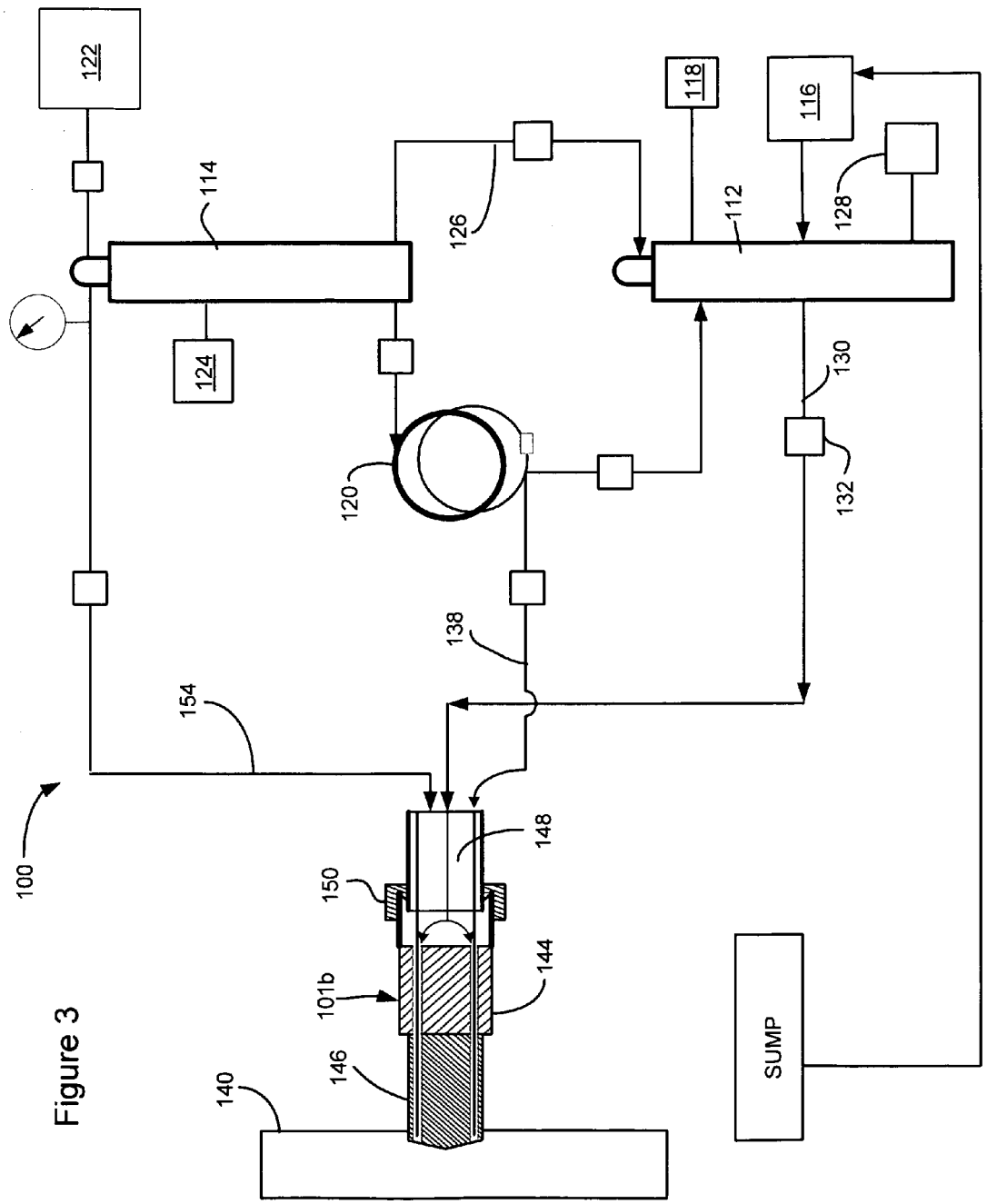
FIG. 3 is a diagram illustrating an embodiment of the present invention employing a through-tool type applicator.

More specifically, FIG. 2 illustrates an embodiment of the present invention in which a spray applicator is employed, while FIG. 3 illustrates an embodiment in which a through-tool applicator is employed. Due to the overall similarities of each of the aforementioned embodiments, the following description applies to both embodiments unless specified otherwise. Each apparatus 100 generally includes a first pressure vessel 112 and a second pressure vessel 114 in fluid communication with an application device 101a, 101b. The first pressure vessel 112 and the second pressure vessel 114 may be constructed from any suitable material and should safely handle pressures of up to 6.0 MPa (800 psi). To the first pressure vessel 112 is added a selected quantity of machining fluid from a storage tank 116 as a solvent, preferably a non-aqueous lubricating fluid as previously identified, or any combination thereof, at a temperature above the gel-point thereof. It should be noted again that while the lubricating fluid is preferably non-aqueous, it is well within the scope of the present invention to provide an aqueous lubricating fluid, or an emulsified fluid, especially if the lubricity thereof is found to be acceptable relative to the intended machining process. Upon supplying the first pressure vessel 112 with the selected quantity of lubricant from the storage tank 116, and any selected additives as previously listed herein, the first pressure vessel 112 may be optionally decompressed by a vacuum pump 118 to remove any ambient air, as previously discussed herein.

Solid carbon dioxide particles are then introduced into the first pressurized vessel 112 containing the selected machining fluid. The solid carbon dioxide particles are preferably formed by means of a capillary condenser 120, such as that as described in commonly owned U.S. Pat. No. 7,293,570, which is hereby incorporated herein by reference. However, the formation of the solid carbon dioxide particles is not critical to practicing the present invention, and other means of forming the solid carbon dioxide particles may be employed, including the use of a convergent-divergent nozzle with liquid carbon dioxide, as is known in the art. Alternatively, the solid carbon dioxide particles may be in the form of dry-ice chips delivered to the pressurized vessel 112. The solid carbon dioxide particles are allowed to come into intimate contact with the machining fluid upon being introduced into the pressurized vessel. Due to the machining fluid having a relatively higher temperature as compared to the solid carbon dioxide particles, and the relatively low initial pressure within the vessel 112, the solid carbon dioxide naturally sublimates and releases, or "bubbles", carbon dioxide gas as a solute into the lubricant and the remaining space within the pressure vessel. Due to the heat of sublimation, this also reduces the temperature of the lubricant as well. Further sublimation of the solid carbon dioxide gradually increases the amount of carbon dioxide gas, and inherently the vapor pressure of carbon dioxide within the pressure vessel. The relatively cool, carbon dioxide gas sublimating from the solid carbon dioxide dissolves into and initially carbonates the machining fluid.

Sublimation continues until the pressure within the pressure vessel 112 reaches approximately 500 kPa (70 psi). At this point, the carbonated lubricant may be removed from the pressure vessel 112 and fed into the application device 101a, 101b for use in the machining process. However, as the most beneficial effects of the carbonation of the machining fluid occur at vapor pressures between 2.0 and 5.5 MPa (300 and 800 psi), continued sublimation of the solid carbon dioxide particles should persist to increase the amount of carbon dioxide dissolved in the machining fluid. This continued sublimation of the solid carbon dioxide particles may continue until a pressure of about 4.1 MPa (600 psi) is reached. Through the heat of sublimation, the sublimating solid carbon dioxide particles tends to decrease the temperature of the machining fluid being carbonated, and the final temperature range of the carbonated machining fluid when employing this technique is in the range of between about −30° C. and 0° C.

Additional carbon dioxide gas from source 122 may be optionally pumped or sparged into the pressure vessel up to approximately 6 MPa (800 psi) to further increase the carbon dioxide vapor pressure and increase the saturation thereof into the lubricant. However, when the vapor pressure of the carbon dioxide begins to exceed 6 MPa, the carbon dioxide gas tends to go into liquid phase, reducing the temperature of the machining fluid to levels where it begins to gel or freeze. This is a deleterious effect causing inherent transport and delivery problems of the carbonated machining fluid through conduits and applicators.

Alternatively, the machining fluid may be carbonated by introducing a high pressure dense liquid into the pressure vessel 112. To the second pressure vessel 114 is added carbon dioxide from supply 122 to form under pressure either liquid phase, gas phase, or both, depending on the specific application and the supplier from which the carbon dioxide can be purchased. To form the dense phase liquid or carbonated coolant, a high pressure pump is used to compress carbon dioxide gas contained within the second pressure vessel into a liquid phase or near-liquid density gas, but not approaching the supercritical point. The carbonated coolant 126 is then pumped from the second pressure vessel 114 to the first pressure vessel 112 to begin carbonation of the lubricant contained therein. The carbon dioxide gas is pumped into the first pressure vessel 112 at about 20° C. and a pressure between about 2.5 to about 3.5 MPa (400 to 500 psi) to form the carbonated machining fluid at ambient temperature. If near-saturated or saturated lubricant is desired, additional carbon dioxide gas is pumped into the first pressure vessel 112 such that the carbon dioxide vapor pressure therein is between about 4.0 to about 5.5 MPa (600 to 800 psi). At these elevated pressures, full carbonation of the machining fluid occurs within several minutes, and upon becoming saturated with the carbon dioxide gas, the carbonated machining fluid can be applied as a minimum quantity lubricant or as a flooded lubricant. Optionally, the lubricant may be cooled by means of the refrigeration unit 128 prior to the introduction of the carbon dioxide to increase its cooling effects during application.

Figure 4:
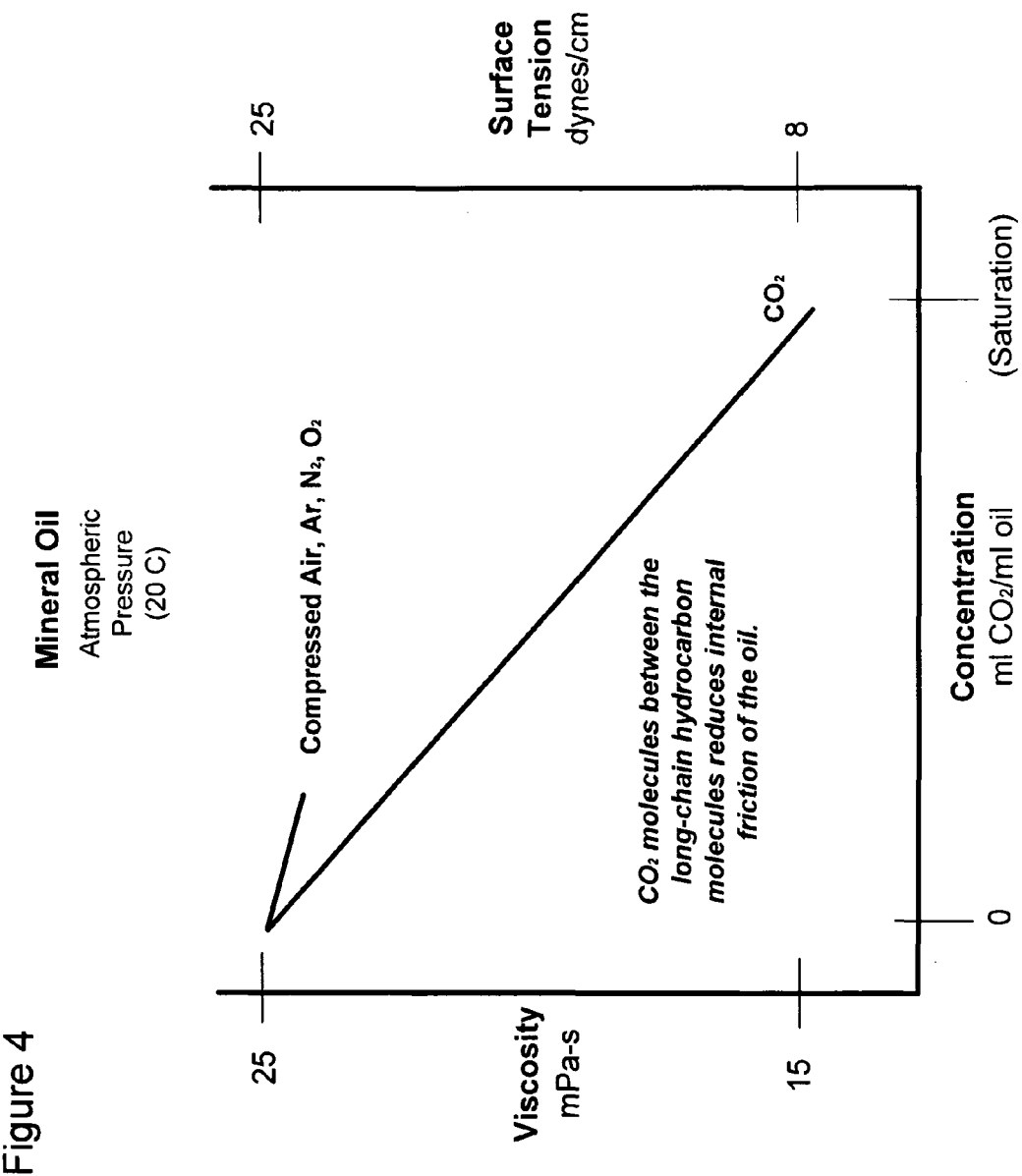
FIG. 4 is a graph depicting the effects carbonation has on viscosity and surface tension properties in a mineral oil.

It should be noted that the methods of carbonation as described above can be used in combination with one another to tune the carbonated machining fluid to a temperature and degree of saturation. Regardless, under a continuous vapor pressure of carbon dioxide, from either the sublimation of the solid carbon dioxide particles or the additional pumped-in carbon dioxide gas or dense gas, near-saturation to saturation of the machining fluid with carbon dioxide is achieved. The resultant carbonated machining fluid, exhibiting between a 10-70% lower viscosity than the initial non-carbonated machining fluid, contains microscopic coolant-lubricant complexes which can be more efficiently delivered into a cutting zone. It has been discovered that stable and uniform compositions of carbonated fluids formed in this way easily pass through convoluted machine tool ports and into cut zones. Beneficial aspects of the present invention include improved particle stability and uniformity, lower machining temperatures, lower viscosity and lower surface tension. FIG. 4, for example, graphically illustrates the beneficial changes of a mineral oil machining fluid saturated with carbon dioxide. Not wanting to be bound by theory, it is believed that carbon dioxide gas under pressure plasticizes the machining oil by filling in the molecular spaces between long chain hydrocarbon molecules. In this way, carbon dioxide gas serves as a lubricant for a lubricant. As a result, both oil viscosity and surface tension are lowered appreciably. Compared to gases such as argon, air, nitrogen and oxygen, carbon dioxide fluids impart significant changes in physicochemical properties of liquid hydrocarbon oils.

It should be also noted that contrary to prior art teachings of carbonated fluids used as lubricants, the machining fluid of the present invention acts as a solvent, with the carbon dioxide dissolving into the lubricant as a solute. It has been discovered by the present inventor that by employing the lubricant as the solvent and the carbon dioxide gas as the solute, and especially when the resulting carbonated fluid is used with minimum quantity lubrication, the lubricity and wettability of the carbonated machining fluid is greatly enhanced.

To transport the carbonated machining fluid to the application tool 101a, 101b, a transport line 130 fluidly connects the first pressure vessel 112 to the application tool 101a, 101b. A metering valve 132 is placed within the transport line 130 to control the rate at which the carbonated machining fluid enters the application tool 101a, 101b. As illustrated in FIG. 2, the applicator 101a is a spray-type applicator, such as that as fully described in commonly owned U.S. Pat. No. 7,389,941, which is hereby incorporated herein by reference. It should be understood, though, that other spray-type applicators are well within the scope of the present invention, including convergent-divergent nozzles and coaxial applicators such as that fully described in U.S. Pat. No. 5,725,154 which is hereby incorporated herein by reference. The carbonated machining fluid enters the body of the applicator 101a, where it can be admixed with a propellant gas 136, such as additional carbon dioxide gas, additional solid carbon dioxide particles 138 from the capillary condenser 120, additives, or any combination thereof, before being exiting the nozzle and being applied to the substrate work piece 140, a machining tool 142, or both, to impart its cooling and lubricating effects.

Alternatively, and as illustrated in FIG. 3, the exemplary application tool 101b includes a spindle 144 having a ported drill bit 146 with a pressure chamber 148 connected to a rotary union 150. An exemplary machining tool for use with the present invention includes assorted right angle or in-line positive feed drilling machines as included in the QUACKENBUSH line of tools as made commercially available by Cooper Industries, Ltd. of Houston, Tex. Another exemplary machining tool for use with the present invention includes turret-mountable spindle motors as made commercially available by NSK-America Corporation of Schaumburg, Ill. Another exemplary cutting tool is that as fully described in commonly owned U.S. patent application Ser. No. 11/301, 441, which is hereby incorporated herein by reference. The carbonated lubricant feed line 130 enters through the rotary union 150 and terminates within the pressure chamber 148. A SWAGELOK® coupling, such as those as made commercially available by the Swagelok Company of Solon, Ohio, secures the carbonated lubricant feed line 130 within the rotary union 150 and yet allows a pressure to be maintained within pressure chamber 148. Also introduced into the pressure chamber through the SWAGELOK® coupling is tube 138 for feeding carbon dioxide snow particles from the capillary condenser 120 into the pressure chamber 148 to be admixed with the carbonated lubricant to form the composite carbonated machining fluid within the pressure chamber 148. The tube 138 fluidly connects to the capillary condenser 120 which produces the carbon dioxide snow particles, as previously discussed herein.

As there tends to be a drop in pressure upon exiting the feed line 130 and entering the pressure chamber 148, to prevent boiling of the carbonated machining fluid within the pressure chamber 148 an overpressure line 154 connects to the rotary union 150 to provide the pressure chamber 148 with a supply of gas or dense phase gas at about 0.5 MPa to 5.5 MPa at 20° C., preferably the dense phase carbon dioxide gas from the second pressure vessel 118 containing the liquid-gas carbon dioxide. Optionally, a stand-alone gas source (not shown) can be provided to feed the overpressure line. It has been discovered by the present inventor that the use of the overpressure line 154 ensures that the pressure within the pressure chamber 150 is maintained at approximately that of the carbonated lubricant, which prevents boiling or premature foaming of the carbonated lubricant within the pressure chamber 150 prior to exiting the tool 101b. This permits the admixing of the carbon dioxide snow particles with the carbonated lubricant without freezing or clogging of the ported drill bit or nozzle. Moreover, dependent upon the intensity of the overpressure, as well as the temperature of the machining fluid, further carbonation of the machining fluid can take place within the pressure chamber of the applicator, especially to super-saturate the carbonated machining fluid. It should be noted that the super-saturation pressure will vary based upon temperature and type of machining fluid employed, which relates to cohesion energy differences between carbon dioxide solute and the lubricant solvent.

Figure 5:
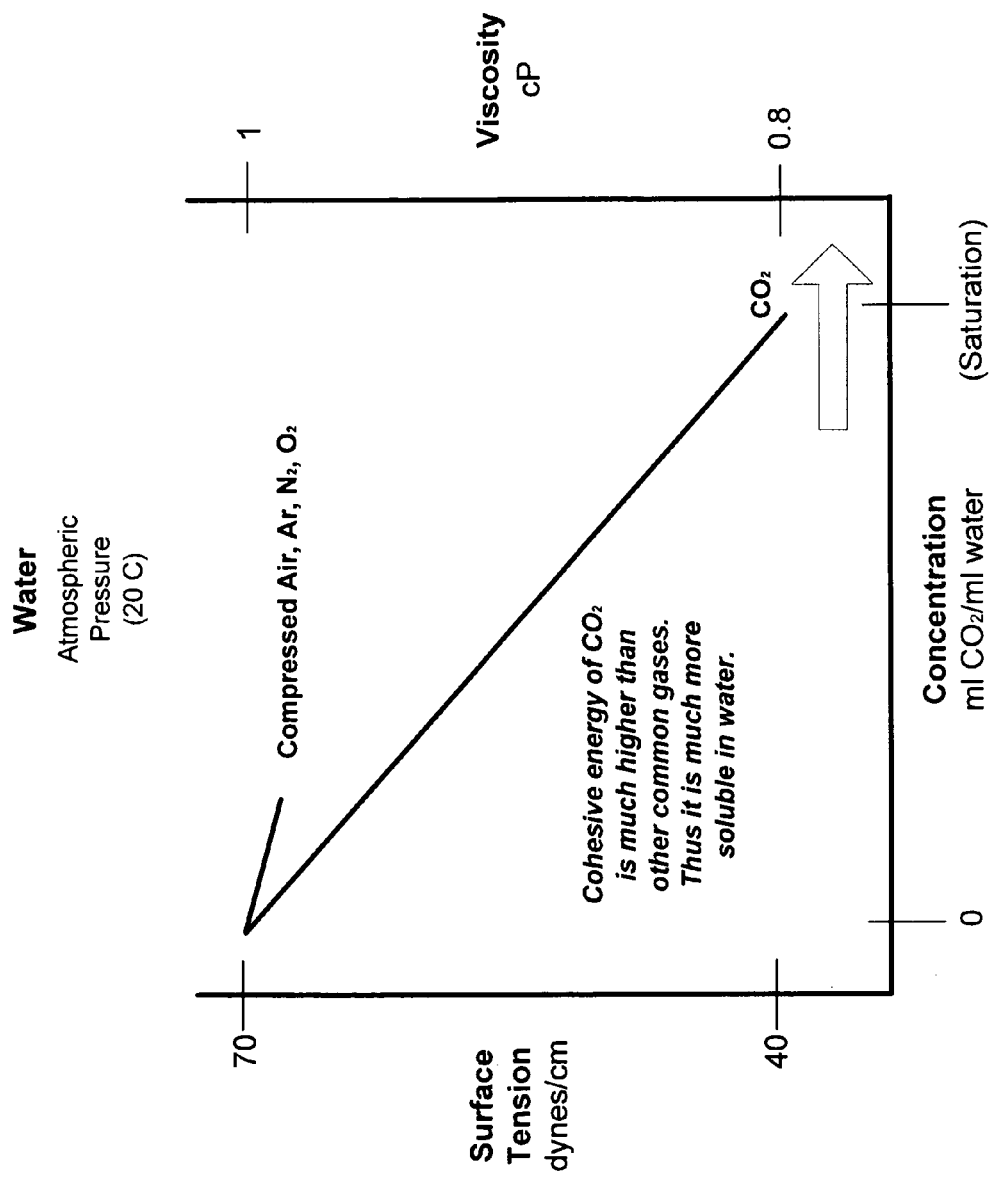
FIG. 5 is a graph depicting the effects carbonation has on viscosity and surface tension properties of an aqueous solution.

Referring now to FIG. 5, the beneficial changes to an aqueous machining fluid saturated with carbon dioxide are illustrated. Again not wanting to be bound by theory, it is believed that carbon dioxide gas under pressure plasticizes the oil-water emulsion machining fluid by filling in the molecular spaces between long chain hydrocarbon molecules as well as forming complexes with water and oil-water molecules. As a result, and with regards only to the water phase component, both water viscosity and surface tension are lowered appreciably. Compared to gases such as argon, air, nitrogen and oxygen, carbon dioxide fluids impart significant changes in the physicochemical properties of liquid water. For example, carbon dioxide complexes with water under certain conditions of pressure and temperature to form gas hydrates which contain liquid-like density of carbon dioxide trapped as a guest in a solvent cage wherein water behaves as the host. Gas hydrates provide a significant volume of carbon dioxide for Joule-Thompson expansion cooling and reactive lubrication within the bulk fluid. At elevated pressures (>44 atm) of CO2 gas and during Joule-Thompson expansion cooling (<20 C), stable gas hydrates (clathrates) may be formed which are stable ice-like structures of water containing significant volumes of near-liquid density carbon dioxide gas. The volume of carbon dioxide stored in these stable $CO_2$ hydrates is greater than what can be achieved with conventional aerosols using compressed air and, when heated in the cutting zone, produce very high local pressures and streaming velocities at cutting surfaces as the carbon dioxide is released.

Figure 6:
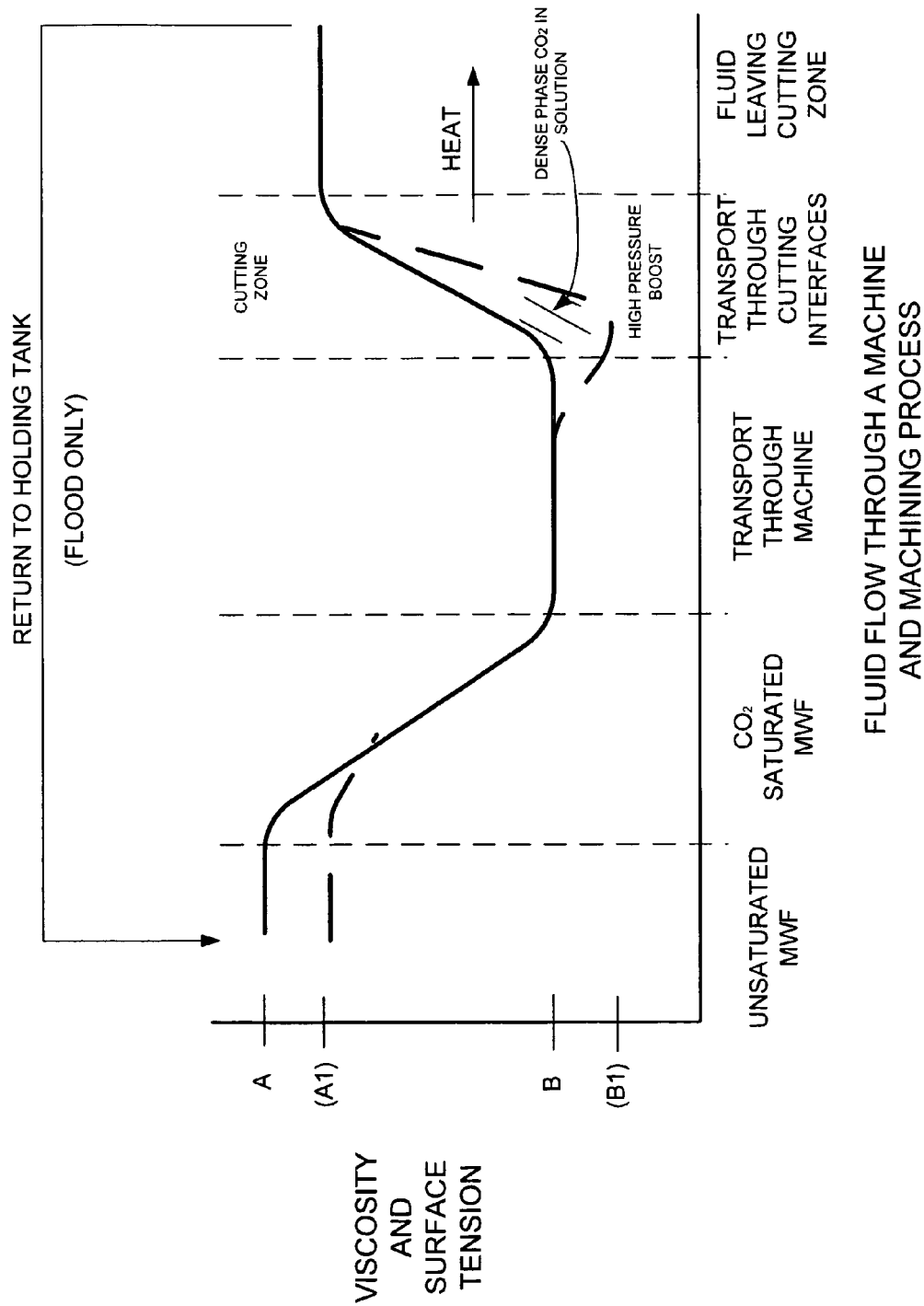
FIG. 6 is a graph depicting the effects carbonation has on viscosity and surface tension of a machining fluid through several stages of the method of the present invention.

FIG. 6 graphically illustrates viscosity changes of the machining fluid prior to carbonation, during carbonation, through transportation to the application device, and eventually at the point of introduction into the cut-zone and points thereafter. Reference A refers to the initial viscosity of a non-carbonated machining fluid, while reference A1 refers to the returning state of the machining fluid after leaving the cutting zone and being partially carbonated. Upon entering the cutting tool and passing into the cutting zone, machining heat and pressure liberate the carbon dioxide from the machining fluid to form a foaming, cooling and reactive metalworking fluid. Reference B refers to the viscosity of the saturated carbonated machining fluid, while reference B1 refers to the viscosity of a super-saturated carbonated machining fluid as effected by a high-pressure boost of carbon dioxide gas within the tool body, such as generated by the overpressure line 154. Upon exiting the cutting zone, the processed metalworking fluid containing residual carbon dioxide gas, chips and heat is returned to the storage tank for reuse.

Although the present invention has been described with reference to preferred embodiments, workers skilled in the art will recognize that changes may be made in form and detail without departing from the spirit and scope of the invention.

The invention claimed is:

1. A method of forming and delivering a carbonated machining fluid to be used in a machining process, the machining process including a tool contacting a substrate, the method comprising:
   supplying a pressure vessel with an oil-based lubricant;
   supplying the pressure vessel with non-supercritical carbon dioxide;
   allowing at least a portion of the non-supercritical carbon dioxide to dissolve into the lubricant to form the carbonated machining fluid;
   delivering the carbonated machining fluid under pressure from the vessel to an applicator; and
   applying the carbonated machining fluid to the tool or the substrate to impart cooling and lubricating effects, wherein supplying the pressure vessel with non-supercritical carbon dioxide includes introducing solid carbon dioxide particles into the pressure vessel wherein the solid carbon dioxide particles sublimate upon contacting the oil-based lubricant.

2. The method of claim 1 wherein the oil-based lubricant initially exhibits a static viscosity of at least about 2 centipoise.

3. The method of claim 1 and further comprising providing an overpressure of carbon dioxide gas to the carbonated machining fluid downstream from the pressure vessel.

4. The method of claim 1 and further comprising pressurizing the vessel with carbon dioxide gas up to 800 psi to increase the solubility of the non-supercritical carbon dioxide into the oil-based lubricant.

5. The method of claim 4 wherein the oil-based lubricant initially exhibits a static viscosity of at least about 2 centipoise.

6. The method of claim 4 and further comprising providing an overpressure of carbon dioxide gas to the carbonated machining fluid downstream from the pressure vessel.

7. A method of forming and delivering a carbonated machining fluid to be used in a machining process, the machining process including a tool contacting a substrate, the method comprising:

supplying a pressure vessel with an oil-based lubricant;
chilling the lubricant to approximately above the gel point of the lubricant prior to the introduction of non-supercritical carbon dioxide into the pressure vessel;
supplying the pressure vessel with non-supercritical carbon dioxide;
allowing at least a portion of the non-supercritical carbon dioxide to dissolve into the lubricant to form the carbonated machining fluid;
delivering the carbonated machining fluid under pressure from the vessel to an applicator;
applying the carbonated machining fluid to the tool or the substrate to impart cooling and lubricating effects.

8. The method of claim 7 wherein the oil-based lubricant initially exhibits a static viscosity of at least about 2 centipoise.

9. The method of claim 7 and further comprising providing an overpressure of carbon dioxide gas to the carbonated machining fluid downstream from the pressure vessel.

10. A method of forming and delivering a carbonated machining fluid to be used in a machining process, the machining process including a tool contacting a substrate, the method comprising:
supplying a pressure vessel with an oil-based lubricant;
supplying the pressure vessel with non-supercritical carbon dioxide;
allowing at least a portion of the non-supercritical carbon dioxide to dissolve into the lubricant to form the carbonated machining fluid;
delivering the carbonated machining fluid under pressure from the vessel to an applicator;
providing solid carbon dioxide particles to the carbonated machining fluid downstream from the pressure vessel; and
applying the carbonated machining fluid to the tool or the substrate to impart cooling and lubricating effects.

11. The method of claim 10 wherein the oil-based lubricant initially exhibits a static viscosity of at least about 2 centipoise.

12. The method of claim 10 and further comprising providing an overpressure of carbon dioxide gas to the carbonated machining fluid downstream from the pressure vessel.

13. A method of forming a non-aqueous oil-based carbonated fluid for use in a machining process to simultaneously cool and lubricate a tool or a work-piece used in the machining process, the method comprising:
providing a pressure vessel;
supplying the vessel with a non-aqueous oil-based lubricant;
chilling the lubricant from ambient temperate to a temperature above the gel point of the lubricant;
supplying the pressure vessel with non-supercritical carbon dioxide, wherein at least a portion of the carbon dioxide dissolves into the lubricant to form the non-aqueous carbonated fluid;
delivering the carbonated fluid under pressure from the vessel to an applicator; and
applying the carbonated fluid to the tool or the substrate.

14. The method of claim 13 wherein the lubricant becomes substantially saturated with the carbon dioxide.

15. The method of claim 13 and further comprising pressurizing the vessel with gaseous carbon dioxide to increase the solubility of the carbon dioxide into the lubricant.

16. The method of claim 13 and further comprising providing an overpressure of carbon dioxide gas to the carbonated fluid downstream from the pressure vessel.

* * * * *